United States Patent [19]
Powers

[11] 3,942,479
[45] Mar. 9, 1976

[54] COMBINED VENTILATOR AND FEEDER FOR AVIAN

[76] Inventor: Gilbert L. Powers, 1831 Monterey Road, South Pasadena, Calif. 91030

[22] Filed: July 1, 1974

[21] Appl. No.: 484,598

[52] U.S. Cl. ............ 119/52 R; 119/21; 119/52 AF
[51] Int. Cl.² ........................................ A01K 39/00
[58] Field of Search ....... 119/16, 21, 22, 28, 52 AF, 119/52 R, 53, 51.5

[56] References Cited
UNITED STATES PATENTS

| | | | |
|---|---|---|---|
| 3,085,552 | 4/1963 | Pilch | 119/52 AF |
| 3,110,286 | 11/1963 | Clute | 119/28 X |

FOREIGN PATENTS OR APPLICATIONS 1,071,407  12/1959  Germany ........................... 119/16

Primary Examiner—J. N. Eskovitz
Attorney, Agent, or Firm—Sellers and Brace

[57] ABSTRACT

A combined ventilator and fluent material feeder for avian including air recirculating and conditioning means. The ventilating and feeder units include self-feeders for both loose food material and drinking water. Each typically includes a trough encircling a storage chamber as well as an air distributor for supplying ventilating air across the floor and outwardly from beneath the feeding troughs as used dirt-laden air is withdrawn from above the feeding troughs.

13 Claims, 4 Drawing Figures

COMBINED VENTILATOR AND FEEDER FOR AVIAN

This invention relates to feeding and ventilating devices for enclosures housing avian, and more particularly to a unique combination feeder and ventilator, alone or in combination with other similar units, and forming part of a recirculating air conditioning system.

Raising avian in confining enclosures involves many problems including proper consideration of ventilation and feeding facilities as well as the health and sanitation conditions. It is recognized that proper temperature conditions of the enclosure are important. It is also recognized that clean air is essential. If the temperature is too high, birds do not eat properly; and if it is too cold, they become too active and do not gain weight as rapidly as is desirable. Confined avian stir up so much fine dust as to present a serious hazard. This is because birds lack cilia in the lungs and bronchial tubes. For this reason the dust mats and seriously interferes with the proper functioning of these critical organs. It frequently results in suffocation and needless loss of life. Attempts to remove the dust by recirculating the air through filters has been less than satisfactory due largely to the fact that the recirculating systems provided do not provide and maintain a supply of clean air at the breathing level of avian.

Another serious shortcoming is the lack of proper feeding conditions including both food and drinking water. Self-feeders for each of these materials are in common use but the crowding of avian around these feeders is attended by objectionable conditions including the presence of moist and filthy litter and the presence of oxygen-deficient and dirt-laden air in the feeding zone.

The present invention obviates these undesirable and hazardous conditions in a very simple and expeditious manner. This is accomplished utilizing combined feeders and ventilators distributed at intervals close to the floor of the enclosure. The feeders are of the self-feeding type, the storage chamber being located immediately above and spaced inwardly from the outer rim of the feeding trough. Clean and properly conditioned ventilating air is supplied centrally of the lower portion of each feeder and distributed uniformly outwardly from beneath the feeding troughs. This clean relatively dry air not only dries any moist litter on the floor but carries away any fine dust and provides the avian with a continuously replenished supply of fresh, clean air at and below breathing levels. At the same time oxygen-deficient dirt-laden air is removed from overlying areas of the enclosure and recirculated past appropriate air cleaning and conditioning auxiliaries before being returned for redistribution. An appropriate quantity of fresh air is added to this recirculating air and, if desirable, a medicant. Any excess air is readily vented from the enclosure through ventilators. One or of the feeding units is supplied with drinking water maintained automatically at a suitable level. Each of the ventilating units also includes appropriate means for regulating air flow as well as means for regulating the height of the feeding trough to accommodate avian of the particular size present in the conditioned enclosure.

In view of the foregoing, it is a primary object of the present invention to provide a unique combined avian feeder and ventilator.

Another object of the invention is the provision of an improved self-feeder for avian equipped with means for supplying conditioned air outwardly from beneath the feeding trough to insure a plentiful supply of conditioned air in the zone occupied by avian while feeding.

Another object of the invention is the provision of an enclosure for avian equipped with air conditioning and ventilating means, the outlet and conditioned air redistributing facilities of which discharge air over the floor from beneath the feeding trough of food and water dispensing devices.

Another object of the invention is the provision of a combined ventilator and self-feeder for avian having means for adjusting the height of the feeder and the distribution of clean air in the immediate feeding area.

Another object of the invention is the provision of means for recirculating and reconditioning the air in an enclosure for avian and including the withdrawal of oxygen-deficient dirt-laden air from upper levels for reconditioning followed by return of the clean conditioned air in close proximity to the floor of the enclosure and in the breathing area of avian present therein.

These and other more specific objects will appear upon reading the following specification and claims and upon considering in connection therewith the attached drawing to which they relate.

Referring now to the drawing in which a preferred embodiment of the invention is illustrated:

Figure 1:
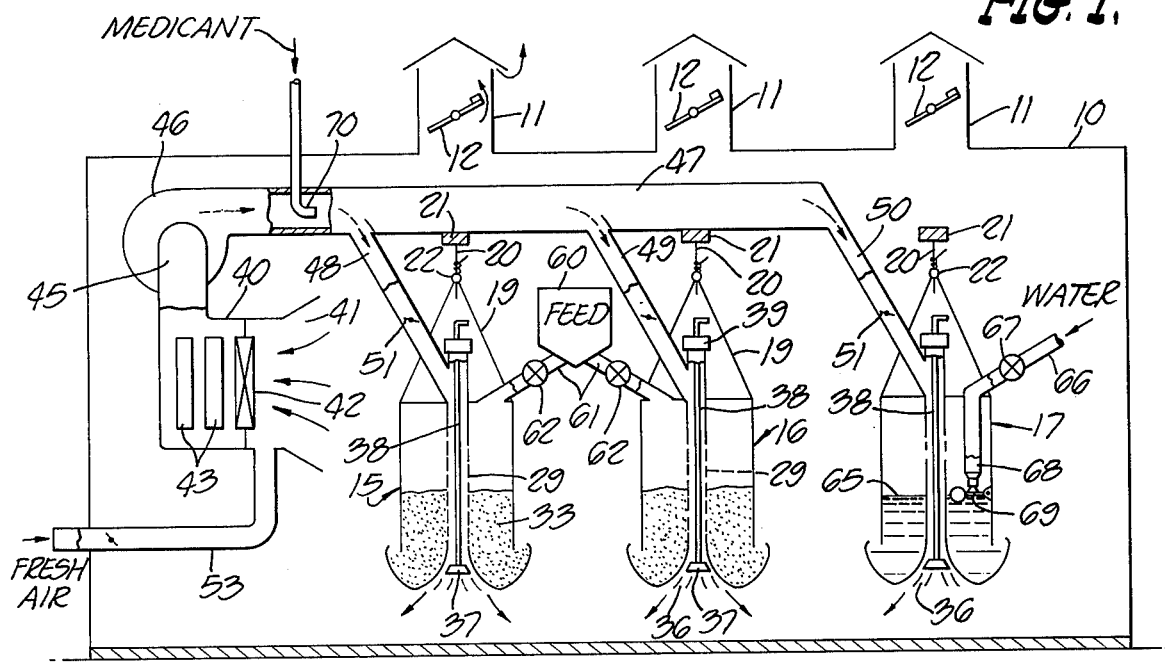
FIG. 1 is a diagrammatic cross-sectional view partly in section through an avian enclosure equipped with the invention air conditioning and ventilating system in combination with water and food feeders.
Figure 2:
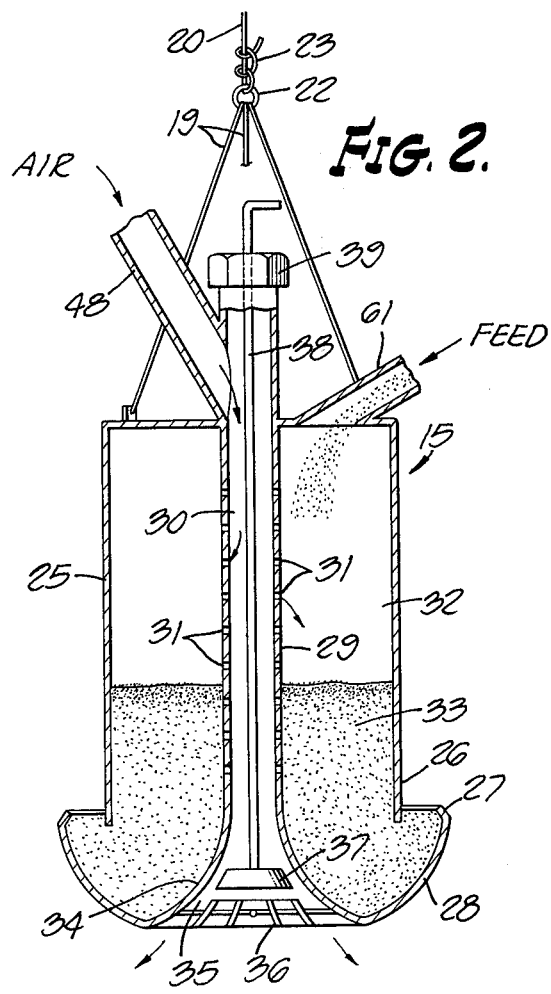
FIG. 2 is a cross-sectional view on an enlarged scale through one of the food feeding and ventilating units.
Figure 3:
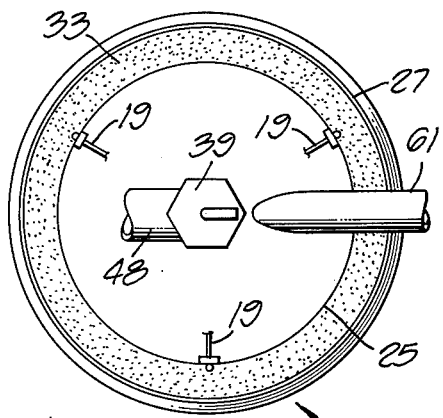
FIG. 3 is a top plan view of FIG. 2.
Figure 4:
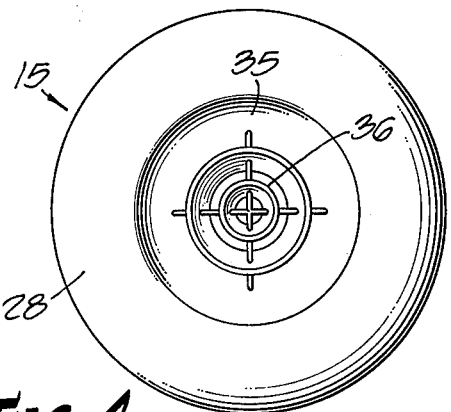
FIG. 4 is a bottom plan view of FIG. 2.

Referring initially and more particularly to FIG. 1, there is shown a typical enclosure 10 for avian, such as poultry of many kinds. The roof of this enclosure is provided with ventilating air outlets 11 each equipped with a pivoting vane 12 biased toward closed position but opening in response to slightly superatmospheric conditions within enclosure 10.

Distributed at intervals about the interior of enclosure 10 are a plurality of combined self-feeders and ventilators 15, 16 and 17. These are suitably supported as by suspension cabling 19, 20 from any suitable supports such as cross beams 21. Cable 20 is connected to cables 19 through a ring 22 and a suitable knot such as a bowline knot 23. By this simple means the feeder 15 can be readily adjusted to a suitable height above the floor of the enclosure to accommodate the particular size of avian using the feeders.

As herein shown by way of example, each of the self-feeders 15 includes an inverted cup-shaped housing 25 having its lower edge 26 terminating closely adjacent but inwardly of the lip edge 27 of the feeding trough 28 and so related thereto as to maintain the trough suitably filled. This feeding trough as herein shown is provided with a tubular member 29 having its upper end passing through and suitably secured to the top of the main housing 25. Tubular member 29 provides a ventilating air passageway 30 and is preferably provided with perforations 31 opening into and supplying conditioned air to the storage chamber 32 of the feeder. This air can pass through the grain or other food material 33 charged into the feeder and escape upwardly through the grain in trough 28.

Tube 29 has a lower flaring end 34 merging with and secured to the feeding trough 28 and provides an air distributing outlet 35 for conditioned air. The air is distributed outwardly and downwardly across the floor by a conical air diffuser 36, the air flow being regulated by a poppet type valve 37. This valve is supported on a stem 38 which extends upwardly through a fitting or bushing 39 on the upper end of pipe 29. The frictional fit of the bushing with stem 38 may be utilized to hold the valve in any adjusted position or this bushing may be threaded to mate with threads on stem 38.

Any suitable air conditioning system may be used to condition and recirculate the air within enclosure 10 and distribute the conditioned air to the several outlet pipes 29. As herein shown by way of example, the air conditioning components are enclosed within a housing 40 having a return air inlet 41 receiving air from the upper portion of enclosure 10. The air conditioning auxiliaries preferably include a dirt filter 42 and a pair of heat exchangers 43 for cooling or heating the air as necessary to provide air of the desired temperature for return into the enclosure. Inasmuch as these air conditioner auxiliaries are well known together with the controls required to maintain the heat exchangers at a desired temperature for either heating or cooling the air, it is not necessary to describe these auxiliaries in greater detail.

Air conditioner 40 includes an exhaust duct 45 opening into the inlet of an air circulating fan 46 discharging into the manifold 47 having branch outlet connections 48, 49 and 50 discharging into the air distributing pipe 29 of each of the feeders 15, 16 and 17. The distributing air ducts 48, 49 and 50 are preferably equipped with regulatable valves 51 for adjusting and equalizing the air flow to each of the feeders.

Desirably the air entering housing 40 is mixed with fresh air supplied from the exterior of enclosure 10 through conduit 53. This assures an adequate supply of make-up oxygen into the enclosure.

Suitable food, such as grain 33, is supplied to the feeders from a storage hopper 60 having outlet ducts 61 opening into the top of each of the feeders 15, 16. Duct 61 is preferably provided with a manually operated normally closed valve 62.

Feeder 17 is substantially identical with feeders 15 and 16 but its storage chamber is maintained charged with a supply of drinking water 65. This water is replenished from a supply pipe 66 equipped with a valve 67 which is normally open. The lower end 68 of supply pipe 66 is provided with any suitable float-controlled valve 69 which opens as the water level falls and recloses as the level is re-established.

The operation and mode of use of the invention will be readily appreciated from the foregoing detailed description of the components. It will be understood that an adequate number of feeders will be distributed about the interior of the enclosure to meet feeding and drinking requirements of poultry or other avian present in the enclosure. Each feeder is adjusted to the proper height for convenient feeding and sufficiently close to the floor that the ventilating air issuing from the diffuser 36 will flow across the underlying floor surface to keep the litter dry. As this issuing air flows outwardly and upwardly from beneath the feeding trough, the feeding trough is in use with a ring of birds grouped thereabout. A major portion of the air will flow upwardly over the front of the birds and between their heads, thereby assuring a supply of freshly conditioned breathing air enveloping the feeding zone. At the same time, other spent air is being withdrawn continuously from the upper portion of enclosure 10 into the inlet 41 of air conditioner 40. This air passes over filter 42 and thence over heat exchangers 43. It will also be understood that a suitable humidifier may comprise a component of the air conditioner. Fresh air is also drawn into the air conditioner through duct 53 and mixed with the other air passing over the air conditioning components. Suitable controls, not shown, will be understood as present and controlling the heat exchangers and humidifier so that the air drawn into the recirculating fan 46 has the desired properties as it flows back to the ventilating pipes 29 of feeders 15, 16 and 17. It is also pointed out that a medicant may be sprayed or otherwise dispensed into the recirculated air through the dispensing nozzle 70.

Since it is desirable to add fresh air from outside the enclosure to assure replenishment of oxygen consumed by the avian, it is desirable to provide for venting excess air back to the atmosphere. This is accomplished through the ventilators 11, 11. Damper valves 12 in these ventilators will be understood as opening automatically in response to slight superatmospheric pressure within the enclosure to vent air to the atmosphere.

Some of the air being returned to the feeders flows through perforations 31 into the food storage chamber 32 where it percolates through the fluent food and escapes upwardly from the surface of the food in the ffeding trough.

While the particular combined ventilator and feeder for avian herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A combination ventilator and fluent material feeder suspendable from an overhead support in a building for avian with the lower feeding end thereof spaced above the building floor, said feeder having a downwardly discharging air supply passage and a storage chamber for fluent material opening into a feeding trough at a convenient feeding height for avian free of obstructions opposite the outer edge thereof, means for supplying fluent material to said storage chamber to maintain said feeding trough filled, and means for circulating air downwardly through said air passage and outwardly over the building floor in the space between the floor and the under side of said trough and about the feet of avian while feeding from said feeding trough.

2. The combination defined in claim 1 characterized in the provision of readily adjustable means for supporting same feeder at different selected heights to accommodate avian of different sizes.

3. The combination defined in claim 1 characterized in that said feeding trough has an arcuate periphery, and said means for circulating air distributes the air generally uniformly outwardly from beneath said arcuate feeding trough.

4. The combination defined in claim 1 characterized in the provision of means for supplying a medicant into the circulating air before the same is exhausted past said feeding trough.

5. The combination defined in claim 1 characterized in the provision of means supplying water to said storage chamber for consumption by avian from said feeding trough.

6. The combination defined in claim 1 characterized in that said feeding trough surrounds and underlies the lower rim edge of said storage chamber.

7. The combination defined in claim 6 characterized in that said means for circulating air extends downwardly through said storage chamber to an air distributor located adjacent the underside of said feeding trough.

8. The combination defined in claim 1 characterized in the provision of means for withdrawing air from the area above said feeding trough and passing the same through air conditioning means before distributing the conditioned air to said downwardly discharging air passage.

9. The combination defined in claim 1 characterized in the provision of means for passing said circulating air through air conditioning means provided with filtering means and heat exchange means before distributing the same outwardly from beneath said feeding trough.

10. That improvement in the ventilating and feeding equipment for a building housing avian which improvement comprises: a plurality of combination feeder and ventilator devices suspendable from overhead support means distributed about the interior of the building with the lower ends thereof spaced close to but above the floor, each of said devices having a downwardly directed air discharge passage and a storage chamber for fluent material opening at its lower end in a feeding trough along the perimeter of said air discharge passage, and power driven means for circulating air to the upper ends of each of said air passages and outwardly over the floor from beneath said feeding troughs and upwardly into the building from about the feet of avian while grouped along said feeding troughs.

11. The combination defined in claim 10 characterized in that at least one of said feeders is for fluent edible material and at least one of said feeders is for drinking water.

12. The combination defined in claim 10 characterized in that said power driven air circulating means includes air conditioning means having a main air intake in communication with the upper portion of said building and a conditioned air outlet in communication with said air discharge passages in said feeder and ventilating devices.

13. The combination defined in claim 12 characterized in the provision of means supplying fresh makeup air from the exterior of said building to the air being distributed from beneath said feeding troughs, and means for venting excess air to the exterior of said building from the upper interior portion thereof.

* * * * *